United States Patent
Yotsumoto et al.

(10) Patent No.: US 10,560,133 B2
(45) Date of Patent: Feb. 11, 2020

(54) DEVICE FOR RADIO COMMUNICATION USING A PLURALITY OF ANTENNAS

(71) Applicant: HITACHI KOKUSAI ELECTRIC INC., Tokyo (JP)

(72) Inventors: Koji Yotsumoto, Tokyo (JP); Yoichi Kushioka, Tokyo (JP); Mitsuhiro Takashima, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 16/120,897

(22) Filed: Sep. 4, 2018

(65) Prior Publication Data

US 2018/0375539 A1    Dec. 27, 2018

Related U.S. Application Data

(63) Continuation-in-part of application No. PCT/JP2017/003419, filed on Jan. 31, 2017.

(30) Foreign Application Priority Data

Mar. 4, 2016    (JP) ................................. 2016-042254

(51) Int. Cl.
*H04B 1/04*    (2006.01)
*H01Q 3/28*    (2006.01)
(Continued)

(52) U.S. Cl.
CPC ............ *H04B 1/0475* (2013.01); *H01Q 3/28* (2013.01); *H01Q 3/36* (2013.01); *H04B 1/1081* (2013.01);
(Continued)

(58) Field of Classification Search
CPC .. H04B 1/0475; H04B 1/0483; H04B 7/0848; H04B 1/1081; H04B 7/0617; H04B 1/40; H04B 2001/0491; H01Q 3/28; H01Q 3/36
(Continued)

(56) References Cited

U.S. PATENT DOCUMENTS 6,784,831 B1 * 8/2004 Wang ...................... G01S 19/21
                                                                    342/357.63
7,139,592 B2 * 11/2006 Leifer .................. H01Q 3/2611
                                                                     455/562.1
2007/0109183 A1    5/2007 Kimata

FOREIGN PATENT DOCUMENTS

JP    2001-326525 A    11/2001
JP    2003-101450 A    4/2003
(Continued)

OTHER PUBLICATIONS

International Search Report and Written Opinion from International Application No. PCT/JP2017/003419 dated Apr. 25, 2017.

*Primary Examiner* — Chieh M Fan
*Assistant Examiner* — Fitwi Y Hailegiorgis
(74) *Attorney, Agent, or Firm* — Brundidge & Stanger, P.C.

(57) ABSTRACT

To provide a device for radio communication using a plurality of antennas, in which: an amplitude/phase adjuster (1) and an amplitude/phase controller (1) control the amplitude and the phase of signals input from at least two antennas such that a directivity, allowing a desired signal to be obtained; an amplitude/phase adjuster (2) and an amplitude/phase controller (2) control the amplitude and the phase of the signals input from the antennas such that an arrival direction of the desired signal becomes a null point and that a directivity, allowing a signal other than the desired signal to be obtained; a signal synthesizer (1) combines the signals; a signal synthesizer (2) combines the signals; and a desired (Continued)

CONFIGURATION BLOCK DIAGRAM OF SECOND RECEPTION DEVICE signal generator removes a signal from the signal synthesizer (2) from a signal from the signal synthesizer (1).

18 Claims, 6 Drawing Sheets

(51) Int. Cl.
    *H01Q 3/36*     (2006.01)
    *H04B 1/10*     (2006.01)
    *H04B 1/40*     (2015.01)
    *H04B 7/06*     (2006.01)

(52) U.S. Cl.
    CPC ............. *H04B 1/40* (2013.01); *H04B 7/0617* (2013.01); *H04B 2001/0491* (2013.01)

(58) Field of Classification Search
    USPC ........................ 375/296; 455/562.1; 342/357
    See application file for complete search history.

(56) References Cited

FOREIGN PATENT DOCUMENTS

| | | |
|---|---|---|
| JP | 2004-048753 A | 2/2004 |
| WO | 2005055466 A1 | 6/2005 |

\* cited by examiner

EXEMPLARY DIRECTIVITY PATTERN

EXEMPLARY PATTERN OF NULL POINT

EXEMPLARY DESIRED PATTERN

FIG. 5 CONFIGURATION BLOCK DIAGRAM OF SECOND RECEPTION DEVICE

FIG. 7 CONFIGURATION BLOCK DIAGRAM OF PRESENT TRANSMISSION DEVICE

CONFIGURATION BLOCK
DIAGRAM OF CONVENTIONAL RECEPTION DEVICE

CONVENTIONAL ANTENNA RADIATION PATTERN

DEVICE FOR RADIO COMMUNICATION USING A PLURALITY OF ANTENNAS

CROSS-REFERENCE TO RELATED APPLICATION

The present application is a continuation-in-part application under 35 U.S.C. § 111(a) of International Application No. PCT/JP2017/003419, filed Jan. 31, 2017, which claims priority to Japanese Patent Application No. 2016-042254, filed Mar. 4, 2016. The contents of these applications are incorporated herein by reference in their entirety.

TECHNICAL FIELD

The present disclosure relates to a reception device and a transmission/reception device for performing communication of radio signals using a plurality of antennas. The present disclosure relates particularly to a reception device and a transmission/reception device capable of reducing the size of antennas to suppress power consumption and thereby improving the communication quality.

BACKGROUND ART

[Conventional Reception Device: FIG. 8]

A conventional reception device will be described with reference to FIG. 8. FIG. 8 is a configuration block diagram of a conventional reception device.

As illustrated in FIG. 8, a conventional reception device includes a plurality of antennas 10, receivers 11 each connected to one of the antennas, analog digital converters (ADCs) 12 each connected to one of the receivers 11, amplitude/phase adjusters 13 each for adjusting the amplitude and the phase of signal data from one of the ADCs 12, an amplitude/phase controller 14 for outputting data for controlling the amplitude and the phase to the amplitude/phase adjusters 13, and a signal synthesizer 15 for combining the respective pieces of signal data the amplitude and the phase of which are controlled.

In the conventional reception device, the antennas 10 receive radio signals, and the receivers 11 output the radio signals to the ADCs 12 as analog signals. The ADCs 12 convert the analog signals into digital signals and output the digital signals to the amplitude/phase adjusters 13.

The amplitude/phase controller 14 outputs data (coefficient) for controlling the amplitude and the phase of each piece of the signal data from the ADCs 12 to the amplitude/phase adjusters 13.

The amplitude/phase adjusters 13 multiply each piece of the signal data from the ADCs 12 by the coefficient from the amplitude/phase controller 14 and outputs data of the reception signals the amplitude and the phase of which are controlled to the signal synthesizer 15.

The signal synthesizer 15 combines the signal data from the amplitude/phase adjusters 13 and outputs the result. The synthesized signal data output from the signal synthesizer 15 is subjected to signal processing by a device not illustrated.

In particular, in the reception device in FIG. 8, the amplitude and the phase of the plurality of antennas 10 are controlled by the amplitude/phase controller 14 in order to obtain a gain in a specific direction. As a result, achieved are functions of placing a directivity in a specific direction and reception of a target wave signal as well as controlling the amplitude and the phase to place a null point in a specific direction for elimination of interference waves in that direction.

[Conventional Antenna Radiation Pattern: FIG. 9]

An example of a radiation pattern in a case where a plurality of conventional antenna is used will be described with reference to FIG. 9. FIG. 9 is a diagram illustrating an example of a conventional antenna radiation pattern.

In an antenna radiation pattern as illustrated in FIG. 9, for example, null points (points between lobes) are narrow as compared with directivities gently forming lobes (with a shape of a protruding rounded tip).

A function of estimating an arrival direction of a signal is implemented by scanning the null points utilizing this characteristic.

[Conventional Interference Suppression Control]

Meanwhile in conventional interference suppression control, in order to separate interference waves and a target wave, reference signals of the interference waves are prepared by incorporation (stored) in advance or prepared by external input.

Alternatively, reference signals may be generated by using signal control technology such as a filter for extracting only interference components from characteristics of reception signals.

Then, by combining the reference signals of the interference waves with the reception signals in signal processing (removing the reference signals of the interference waves from the reception signals), interference wave components are suppressed.

Moreover, in recent years, technology of suppressing interference waves by generating a radiation pattern using a plurality of antennas and adjusting a null point to be directed in an arrival direction of an interference wave has also been in use.

RELATED ART

As a related art, JP 2004-048753 A "Sector antenna device" (Hitachi Kokusai Electric Inc.) [Patent Literature 1] is to be noted.

Patent Literature 1 discloses a sector antenna device that forms a directional sector and radio-communicates with a mobile station of the sector. The directivity of the sector is changed depending on a communication state with the mobile station.

CITATION LIST

Patent Literature

Patent Literature 1: JP 2004-048753 A

SUMMARY OF DISCLOSURE

Technical Problem

However, in a conventional reception device using a plurality of antennas, there are problems that, when directivity control is performed by the plurality of antennas, a sufficiently narrow directivity cannot be generated unless a large number of antennas are mounted and that the size of the device increases in order to obtain the effect of interference suppression, which results in increased power consumption and a higher price.

Similarly, in the conventional method of generating a radiation pattern by a plurality of antennas to suppress an interference wave, in a case where the number of interference waves is increased, a radiation pattern having a necessary number of lobes or null points cannot be formed unless the number of antennas is increased according to the number of the interference waves. Therefore, the size of the device increases with increased power consumption and a higher price, thereby making it difficult to control interference suppression that sufficiently matches the actual environment with a practical number of antennas.

Moreover, even in a reception device including a large number of antennas, it is difficult to implement the control of a radiation pattern that follows all the arrival directions of a large number of fluctuating interference waves with a capability of a signal processing device usually mounted on a wireless device.

Furthermore, in cases where a reference signal of an interference wave cannot be prepared or there is a plurality of interference waves, interference suppression cannot be performed sufficiently by the conventional interference suppression method.

In addition, the method of preparing a reference signal is not effective in a case where a reference signal of an interference wave is unknown. It is also difficult to specify an interference signal from a reception signal in an environment where a plurality of interference waves exists, and thus a characteristic of sufficient signal quality cannot be obtained.

The present disclosure has been devised in view of the above circumstances. An object of the present disclosure is to provide a reception device and a transmission/reception device capable of reducing the number of antennas and thereby achieving the effect of downsizing with suppressed power consumption and improved communication quality.

Solution to Problem

An embodiment of the present disclosure for solving the problems of the above conventional example is a reception device for receiving a radio signal. The reception device includes: a first amplitude/phase controller that controls an amplitude and a phase of each signal input from a plurality of antennas such that a directivity, allowing a desired signal to be obtained, is obtained; a second amplitude/phase controller that controls an amplitude and a phase of each signal input from the plurality of antennas such that an arrival direction of the desired signal becomes a null point and that a directivity, allowing a signal other than the desired signal to be obtained, is obtained; a first synthesizer that combines the respective signals having been controlled by the first amplitude/phase controller; a second synthesizer that combines the respective signals having been controlled by the second amplitude/phase controller; and a desired signal generator that removes a signal output from the second synthesizer from a signal output from the first synthesizer.

An embodiment discloses a device for radio communication using a plurality of antennas, the device includes: a first amplitude/phase controller configured to control an amplitude and a phase of a first receiving signal being input by a first receiving antenna to obtain a directivity for a desired signal and to output a first desired signal, and to control an amplitude and a phase of a second receiving signal being input by a second receiving antenna to obtain a directivity for the desired signal and to output a second desired signal; a second amplitude/phase controller configured to control an amplitude and a phase of the first receiving signal to obtain a directivity for a first undesirable signal by identifying an arrival direction of the desired signal as a null point and to output a first null point signal, and to control an amplitude and a phase of the second receiving signal to obtain a directivity for the first undesirable signal by identifying an arrival direction of the desired signal as a null point and to output a second null point signal; a first receiving synthesizer configured to synthesize the first desired signal with the second desired signal, and to output a first synthesized signal; a second receiving synthesizer configured to synthesize the first null point signal with the second null point signal, and to output a second synthesized signal; and a desired signal generator configured to output a synthesized signal synthesizing the first synthesized signal with the second synthesized signal.

An embodiment of the present disclosure is the reception device described above, further including a gain/phase controller that controls a gain and a phase of the signal output from the second synthesizer and outputs the signal to the desired signal generator.

An embodiment of the present disclosure is the reception device described above, in which an amplitude/phase controller corresponding to the second amplitude/phase controller and a synthesizer and a gain/phase controller corresponding to the second synthesizer and the gain/phase controller, respectively, are provided for each of the signals other than the desired signal.

An embodiment of the present disclosure is the reception device described above, in which the desired signal is a target wave signal or a specific interference wave signal.

An embodiment of the present disclosure is a transmission/reception device including the reception device described above and a transmission device, in which the transmission device includes: a first amplitude/phase controller on a transmission side that performs, on one of divided transmission signals, the control performed by the first amplitude/phase controller in the reception device; a second amplitude/phase controller on the transmission side that performs, on the other one of the divided transmission signals, the control performed by the second amplitude/phase controller in the reception device; a first synthesizer and a second synthesizer on the transmission side that each combine the transmission signals from the first and the second amplitude/phase controllers on the transmission side; a normalizer that performs normalization of the transmission signals from the first synthesizer and the second synthesizer; a plurality of transmitters that transmits output signals from the normalizer; and antennas each connected to one of the transmitters.

Advantageous Effects of Disclosure

An embodiment of the present disclosure is a reception device including: a first amplitude/phase controller that controls an amplitude and a phase of each signal input from a plurality of antennas such that a directivity, allowing a desired signal to be obtained, is obtained; a second amplitude/phase controller that controls an amplitude and a phase of each signal input from the plurality of antennas such that an arrival direction of the desired signal becomes a null point and that a directivity, allowing a signal other than the desired signal to be obtained, is obtained; a first synthesizer that combines the respective signals having been controlled by the first amplitude/phase controller; a second synthesizer that combines the respective signals having been controlled by the second amplitude/phase controller; and a desired signal generator that removes a signal output from the second synthesizer from a signal output from the first synthesizer. This reduces the number of antennas and thereby achieves the effect of downsizing with suppressed power consumption and improved communication quality.

An embodiment of the present disclosure is a transmission/reception device including the reception device described above and a transmission device, in which the transmission device includes: a first amplitude/phase controller on a transmission side that performs, on one of divided transmission signals, the control performed by the first amplitude/phase controller in the reception device; a second amplitude/phase controller on the transmission side that performs, on the other one of the divided transmission signals, the control performed by the second amplitude/phase controller in the reception device; a first synthesizer and a second synthesizer on the transmission side that each combine the transmission signals from the first and the second amplitude/phase controllers on the transmission side; a normalizer that performs normalization of the transmission signals from the first synthesizer and the second synthesizer; a plurality of transmitters that transmits output signals from the normalizer; and antennas each connected to one of the transmitters. This reduces the number of antennas and thereby achieves the effect of downsizing with suppressed power consumption and improved communication quality.

DESCRIPTION OF EMBODIMENTS

Embodiments of the present disclosure will be described with reference to the drawings.

Summary of Embodiments

In a reception device according to an embodiment of the present disclosure, a first amplitude/phase controller controls an amplitude and a phase of each signal input from a plurality of antennas such that a directivity, allowing a desired signal to be obtained, is obtained, a second amplitude/phase controller controls an amplitude and a phase of each signal input from the plurality of antennas such that an arrival direction of the desired signal becomes a null point and that a directivity, allowing a signal other than the desired signal to be obtained, is obtained, a first synthesizer combines the respective signals having been controlled by the first amplitude/phase controller, a second synthesizer combines the respective signals having been controlled by the second amplitude/phase controller, and a desired signal generator removes a signal output from the second synthesizer from a signal output from the first synthesizer. This reduces the number of antennas and thereby enabling downsizing with suppressed power consumption and improved communication quality.

A transmission/reception device according to an embodiment of the present disclosure includes the reception device described above and a transmission device. In the transmission device, a first amplitude/phase controller on a transmission side performs, on one of divided transmission signals, the control performed by the first amplitude/phase controller in the reception device, a second amplitude/phase controller on the transmission side performs, on the other one of the divided transmission signals, the control performed by the second amplitude/phase controller in the reception device, a first synthesizer and a second synthesizer on the transmission side each combine the transmission signals from the first and the second amplitude/phase controllers on the transmission side, a normalizer performs normalization of the transmission signals from the first synthesizer and the second synthesizer, a plurality of transmitters transmits output signals from the normalizer, and antennas are each connected to one of the transmitters. This reduces the number of antennas and thereby enabling downsizing with suppressed power consumption and improved communication quality.

Figure 1:
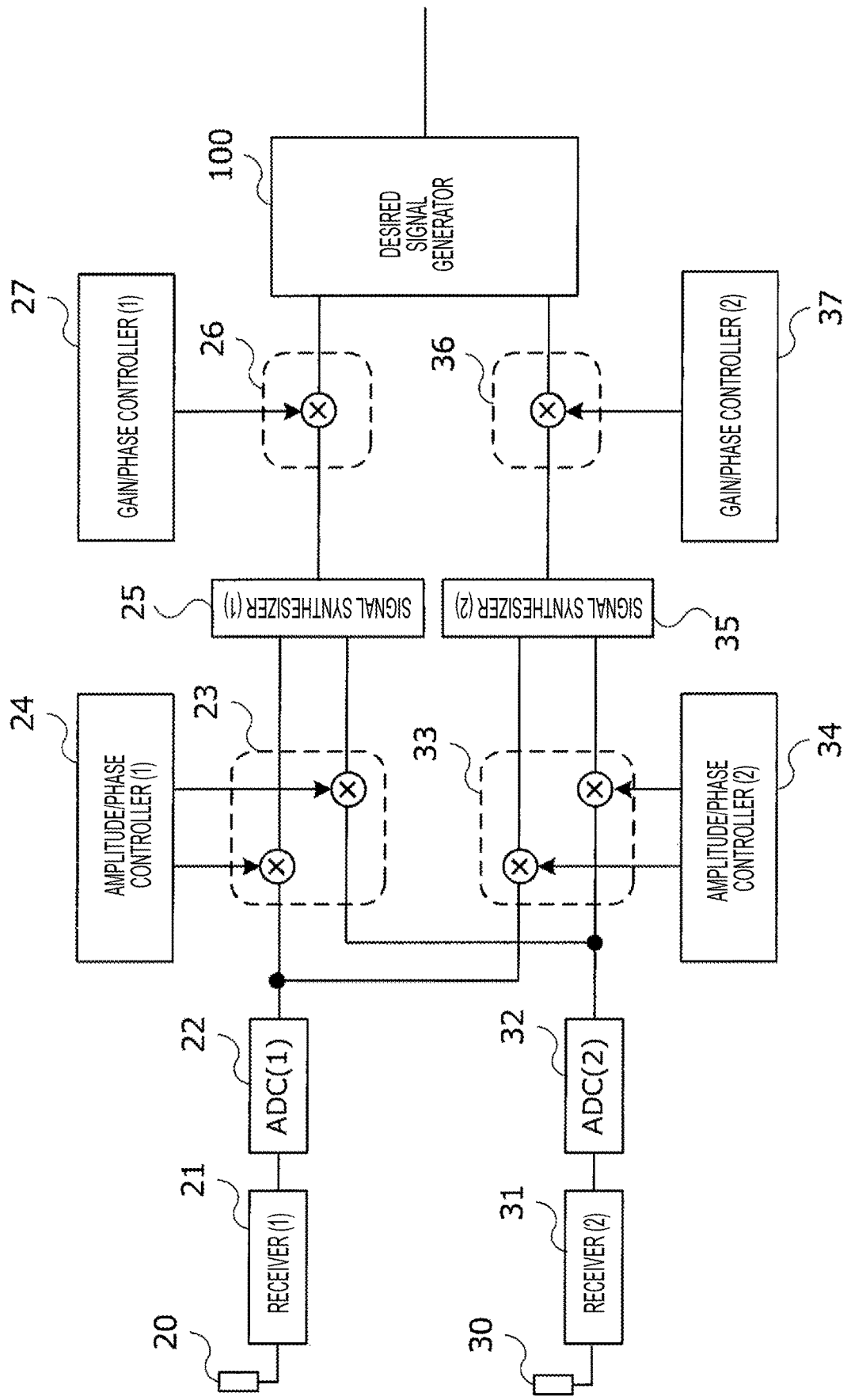
FIG. 1 is a configuration block diagram of a reception device according to an embodiment of the present disclosure.

[Present Reception Device: FIG. 1]

A reception device according to an embodiment of the present disclosure will be described with reference to FIG. 1. FIG. 1 is a configuration block diagram of a reception device according to an embodiment of the present disclosure.

As illustrated in FIG. 1, a reception device according to an embodiment of the present disclosure (present reception device: first reception device) essentially includes antennas 20 and 30, a receiver (1) 21, a receiver (2) 31, an ADC (1) 22, an ADC (2) 32, amplitude/phase adjusters (1) 23, amplitude/phase adjusters (2) 33, an amplitude/phase controller (1) 24, an amplitude/phase controller (2) 34, a signal synthesizer (1) 25, a signal synthesizer (2) 35, a gain/phase adjuster (1) 26, a gain/phase adjuster (2) 36, a gain/phase controller (1) 27, a gain/phase controller (2) 37, and a desired signal generator 100.

The amplitude/phase controller (1) 24 is configured to control an amplitude and a phase of a first receiving signal being input by a first receiving antenna 20 to obtain a directivity for a desired signal and to output a first desired signal, and to control an amplitude and a phase of a second receiving signal being input by a second receiving antenna 30 to obtain a directivity for the desired signal and to output a second desired signal.

The amplitude/phase controller (2) 34 is configured to control an amplitude and a phase of the first receiving signal to obtain a directivity for a first undesirable signal by identifying an arrival direction of the desired signal as a null point and to output a first null point signal, and to control an amplitude and a phase of the second receiving signal to obtain a directivity for the first undesirable signal by identifying an arrival direction of the desired signal as a null point and to output a second null point signal.

The signal synthesizer (1) 25, as a first receiving synthesizer, is configured to synthesize the first desired signal with the second desired signal, and to output a first synthesized signal.

The signal synthesizer (2) 35, as a second receiving synthesizer, is configured to synthesize the first null point signal with the second null point signal, and to output a second synthesized signal.

The desired signal generator 100 is configured to output a synthesized signal synthesizing the first synthesized signal with the second synthesized signal.

[Respective Components of Present Reception Device]

Respective components of the present reception device will be specifically described.

The antenna 20 is connected to the receiver (1) 21, and the receiver (1) 21 is connected to the ADC (1) 22.

The antenna 30 is connected to the receiver (2) 31, and the receiver (2) 31 is connected to the ADC (2) 32.

An output from the ADC (1) 22 is divided and is thereby output to an amplitude/phase adjuster (1) 23 and an amplitude/phase adjuster (2) 33.

An output from the ADC (2) 32 is divided and is thereby output to an amplitude/phase adjuster (1) 23 and an amplitude/phase adjuster (2) 33.

The amplitude/phase adjusters (1) 23 multiply signal data from the ADC (1) 22 and the ADC (2) 32 by data (coefficient) for controlling the amplitude and the phase from the amplitude/phase controller (1) 24 and output the results to the signal synthesizer (1) 25.

The amplitude/phase adjuster (2) 33 multiplies signal data from the ADC (1) 22 and the ADC (2) 32 by data (coefficient) for controlling the amplitude and the phase from the amplitude/phase controller (2) 34 and outputs the results to the signal synthesizer (2) 35.

The amplitude/phase controller (1) 24 outputs, to the amplitude/phase adjuster (1) 23, the coefficient for controlling the amplitude and the phase for to the signal data from the ADC (1) 22 and the signal data from the ADC (2) 32.

By the operation of the amplitude/phase adjusters (1) 23 and the amplitude/phase controller (1) 24, control and adjustment are performed such that a directivity pattern for acquiring a desired signal (target wave or interference wave) is formed.

A "first amplitude/phase controller" in the claims includes the amplitude/phase adjusters (1) 23 and the amplitude/phase controller (1) 24.

The amplitude/phase controller (2) 34 outputs, to the amplitude/phase adjusters (2) 33, the coefficient for controlling the amplitude and the phase for to the signal data from the ADC (1) 22 and the signal data from the ADC (2) 32.

By the operation of the amplitude/phase adjusters (2) 33 and the amplitude/phase controller (2) 34, control and adjustment are performed such that an arrival direction of a desired signal becomes null and that a directivity pattern for acquisition of signals other than the desired signal is formed.

A "second amplitude/phase controller" in the claims includes the amplitude/phase adjusters (2) 33 and the amplitude/phase controller (2) 34.

The signal synthesizer (1) 25 combines the two pieces of signal data input from the amplitude/phase adjusters (1) 23 and outputs signal data having a directivity pattern in the arrival direction of the desired signal to the gain/phase adjuster (1) 26.

The signal synthesizer (2) 35 combines the two pieces of signal data input from the amplitude/phase adjusters (2) 33 to make the arrival direction of the desired signal null and outputs signal data having a directivity pattern in arrival directions of signals other than that of the desired signal to the gain/phase adjuster (2) 36.

The gain/phase adjuster (1) 26 multiplies the signal data from the signal synthesizer (1) 25 by data (coefficient) for controlling the gain and the phase from the gain/phase controller (1) 27 and outputs the result to the desired signal generator 100.

By the operation of the gain/phase adjuster (1) 26 and the gain/phase controller (1) 27, control and adjustment are performed such that a directivity pattern for acquisition of the desired signal becomes optimum for acquisition of the desired signal in the desired signal generator 100. For example, in a case where an offset signal is included in the signal data, correction for removing the offset signal is performed.

The gain/phase adjuster (2) 36 multiplies the signal data from the signal synthesizer (2) 35 by data (coefficient) for controlling the gain and the phase from the gain/phase controller (2) 37 and outputs the result to the desired signal generator 100.

By the operation of the gain/phase adjuster (2) 36 and the gain/phase controller (2) 37, control and adjustment are performed such that a directivity pattern for acquisition of signals other than the desired signal becomes optimum for acquisition of the desired signal in the desired signal generator 100.

For example, in a case where the desired signal is a target wave signal and the signals other than the desired signal are interference wave signals, the gain in the gain/phase controller (1) 27 corresponding to the target wave signal is controlled to be 1 with the phase left unchanged while the gain in the gain/phase controller (2) 37 corresponding to the interference wave signals is controlled to be less than or equal to 1 with the phase controlled such that the interference wave signals are suppressed the most.

The desired signal generator 100 combines the signal data (first signal data) from the gain/phase adjuster (1) 26 and the signal data (second signal data) from the gain/phase adjuster (2) 36 (removes the second signal data from the first signal data) and outputs the result.

[Operation of Present Reception Device]

A radio signal arriving at the antenna 20 is received by the receiver (1) 21 and converted into a digital signal by the ADC (1) 22.

Similarly, a radio signal arriving at the antenna 30 is received by the receiver (2) 31 and converted to a digital signal by the ADC (2) 32.

The digital signals converted by the ADC (1) 22 and the ADC (2) 32 are multiplied by the coefficient from the amplitude/phase controller (1) 24 by the amplitude/phase adjusters (1) 23 and then output to the signal synthesizer (1) 25. Here, control and adjustment are performed such that a directivity pattern is formed in the arrival direction of the desired signal.

Similarly, the digital signals converted by the ADC (1) 22 and the ADC (2) 32 are multiplied by the coefficient from the amplitude/phase controller (2) 34 by the amplitude/phase adjusters (2) 33 and then output to the signal synthesizer (2) 35. Here, control and adjustment are performed such that a directivity pattern is formed in an arrival direction of a signal other than the desired signal.

The signal from the signal synthesizer (1) 25 is multiplied by the coefficient for controlling the gain and the phase from the gain/phase controller (1) 27 by the gain/phase adjuster (1) 26 and then output to the desired signal generator 100.

Similarly, the signal from the signal synthesizer (2) 35 is multiplied by the coefficient for controlling the gain and the phase from the gain/phase controller (2) 37 by the gain/phase adjuster (2) 36 and then output to the desired signal generator 100.

The desired signal generator 100 combines the signal (first signal) from the gain/phase adjuster (1) 26 and the signal (second signal) from the gain/phase adjuster (2) 36 (removes the second signal from the first signal) and outputs the result. By the signal processing by the desired signal generator 100, a desired signal is obtained.

Note that the desired signal may be a target wave signal or an interference wave signal. In the case of a target wave signal, a radio signal that is to be originally received is extracted. Meanwhile in the case of an interference wave signal, interference wave signals to be suppressed are extracted.

Figure 2:
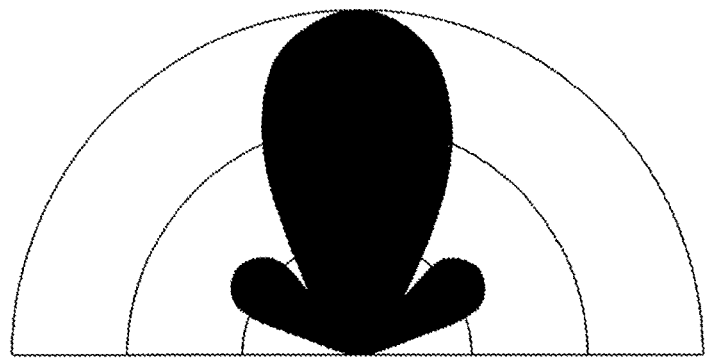
FIG. 2 is a diagram illustrating an example of a directivity pattern formed by a signal synthesizer (1).
Figure 3:
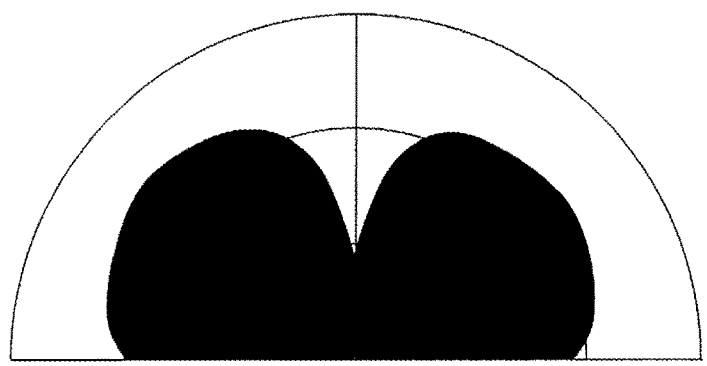
FIG. 3 is a diagram illustrating an example of a directivity pattern formed by a signal synthesizer (2).
Figure 4:
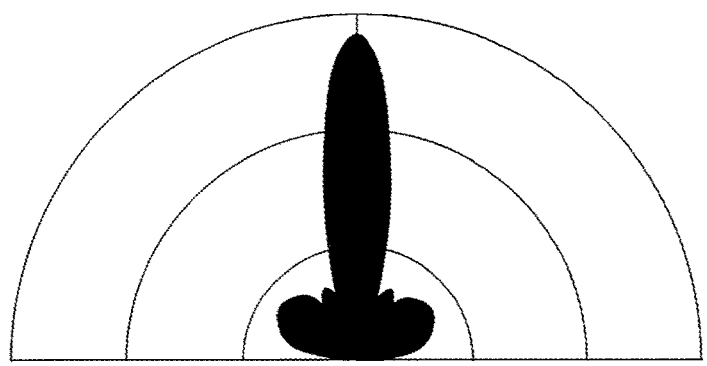
FIG. 4 is a diagram illustrating a directivity pattern formed by a desired signal generator.

[Directivity Pattern: FIGS. 2 to 4]

Next, a directivity pattern in the present reception device will be described with reference to FIGS. 2 to 4. FIG. 2 is a diagram illustrating an example of the directivity pattern formed by the signal synthesizer (1). FIG. 3 is a diagram illustrating an example of the directivity pattern formed by the signal synthesizer (2). FIG. 4 is a diagram illustrating a directivity pattern formed by the desired signal generator.

The directivity pattern obtained by the signal synthesizer (1) 25 by the signal processing in the amplitude/phase adjusters (1) 23 and the amplitude/phase controller (1) 24 has an intense directivity in an arrival direction of a desired signal as illustrated in FIG. 2.

Furthermore, as illustrated in FIG. 3, the directivity pattern obtained by the signal synthesizer (2) 35 by the signal processing in the amplitude/phase adjusters (2) 33 and the amplitude/phase controller (2) 34 has a null point in the arrival direction of the desired signal.

As illustrated in FIG. 4, the directivity pattern formed by the desired signal generator 100 is a combination of the pattern of FIG. 2 and the pattern of FIG. 3 (pattern obtained by removing the pattern of FIG. 3 from the pattern of FIG. 2).

[Effect of Present Reception Device]

According to the present reception device, the output from the desired signal generator 100 has a narrow and sharp directivity in the arrival direction of the desired signal. That is, a sharp directivity pattern with respect to a desired signal can be obtained even with a small number of antennas of two, thereby allowing a reception signal with high quality to be obtained.

Furthermore, since the present reception device includes a small number of antennas and circuits for signal processing connected to the antennas, downsizing can be implemented with suppressed power consumption and reduced cost of the device.

Note that, the directivity pattern with a null point formed in the arrival direction of the desired signal is formed in the signal synthesizer (2) 35; however, it is also possible to form a directivity pattern directed in an arrival direction of another signal other than the desired signal with a null point formed in the arrival direction of the desired signal.

For example, in a case where a desired signal is a target wave signal, it is possible to form a directivity pattern that captures an interference wave signal from a specific direction.

With this pattern, in the case where the desired signal is the target wave signal and a signal other than the desired signal is an interference wave signal, a directivity pattern of the interference wave signal can be effectively removed from the directivity pattern of the desired wave signal.

In the case where the desired signal is the target wave signal, an arrival direction of the target wave signal is likely to be determined as a single direction not only in the case where the arrival direction is determined to be a specific direction such as a wireless relay station but also in cases of being in a tunnel or a street cell. Moreover, also with a reception signal of a base station for mobile devices, a single direction is dominant although an arrival direction from a single user fluctuates.

Therefore, by using the present reception device for suppression of a group of interference waves arriving from other directions, characteristics equivalent to those obtained by generation of a narrow directivity in the arrival direction of the target wave signal can be implemented.

Therefore, in the case where there is a single arrival direction of desired signals received simultaneously, it is sufficient to form only one null point. Therefore, implementation is possible with two antennas.

In the case where there are two or more arrival directions of desired signals or a control range of a null point is expanded, implementation is possible by increasing the number of antennas depending on the number of arrival directions or the number of null points.

[Case where Desired Signal is Interference Wave Signal]

Next, a case where a desired signal is an interference wave signal will be described.

In a communication environment in which an interference wave signal arrives from one direction and an arrival direction of a target wave signal fluctuates, the present reception device can be used to generate a reference signal of the interference wave signal.

Specifically, by directing the main lobe toward the arrival direction of the interference wave signal to obtain an interference wave reference signal with improved gain, obtaining, as target wave signals, signals from a group of target waves arriving from other directions by directing a null point toward the arrival direction of the interference wave signal, and performing signal processing of combining the two types of signals (removing the target wave signals from the interference wave signal), a high-quality interference wave reference signal in which target wave signals are suppressed and high gain of interference wave signals is achieved, can be extracted.

That is, the interference wave reference signal extracted by directing the main lobe is used as a canceller.

Furthermore, in the case where there are two or more arrival directions of interference wave signals received simultaneously or a control range of a null point is expanded when an interference wave reference signal is extracted, implementation is possible by increasing the number of antennas depending on the number of arrival directions or the number of null points.

Figure 5:
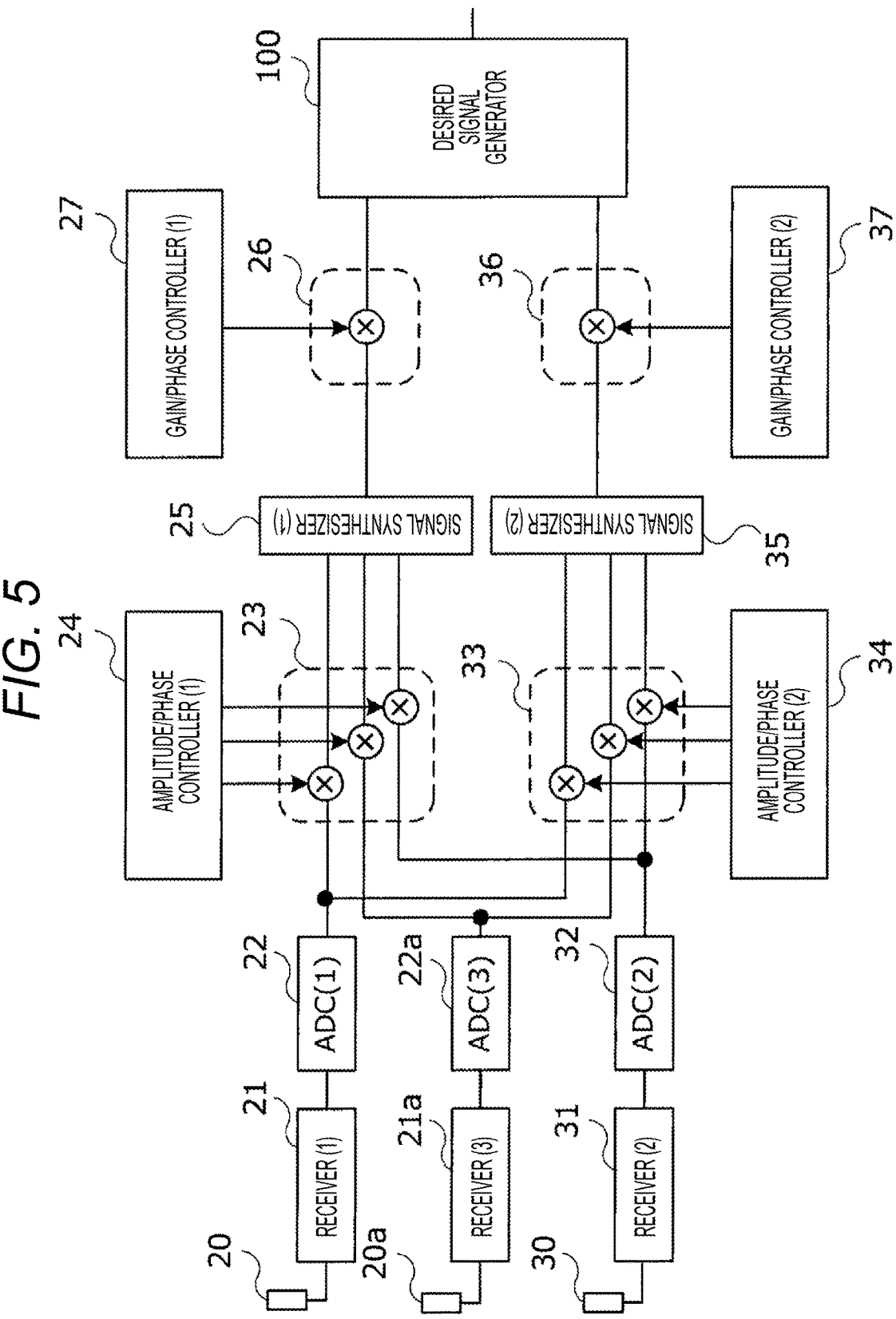
FIG. 5 is a configuration block diagram of a second reception device.

[Second Reception Device: FIG. 5]

A second reception device (second reception device) according to the embodiment of the present disclosure will be described with reference to FIG. 5. FIG. 5 is a configuration block diagram of the second reception device.

In the second reception device, three antennas are included and a directivity pattern with sharper lobes is formed from reception signals obtained from the three antennas, thereby outputting a desired signal.

As illustrated in FIG. 5, different points from the present reception device (first reception device) is that a third antenna 20*a*, a receiver (3) 21*a*, and an ADC (3) 22*a* are included and that an output from the ADC (3) 22*a* is divided with one of them output to an amplitude/phase adjuster (1) 23 and the other to an amplitude/phase adjuster (2) 33.

Furthermore, the amplitude/phase controller (1) 24 outputs a coefficient for controlling the amplitude and the phase of the signal from the ADC (3) 22*a* to the amplitude/phase adjusters (1) 23. The amplitude/phase adjuster (1) 23 multiplies the signal from the ADC (3) 22*a* by the coefficient from the amplitude/phase controller (1) 24 and outputs the result to a signal synthesizer (1) 25.

In addition, the amplitude/phase controller (2) 34 outputs a coefficient for controlling the amplitude and the phase of the signal from the ADC (3) 22a to the amplitude/phase adjusters (2) 33. An amplitude/phase adjuster (2) 33 multiplies the signal from the ADC (3) 22a by the coefficient from the amplitude/phase controller (2) 34 and outputs the result to the signal synthesizer (2) 35.

According to the second reception device, since the number of antennas is increased from two to three, the lobes become sharper in the directivity patterns illustrated in FIGS. 2 and 3 as compared to those of the first reception device. Therefore, in a directivity pattern obtained by a desired signal generator 100 an arrival direction of a desired signal can be more appropriately narrowed, thereby allowing the signal quality to be increased.

Figure 6:
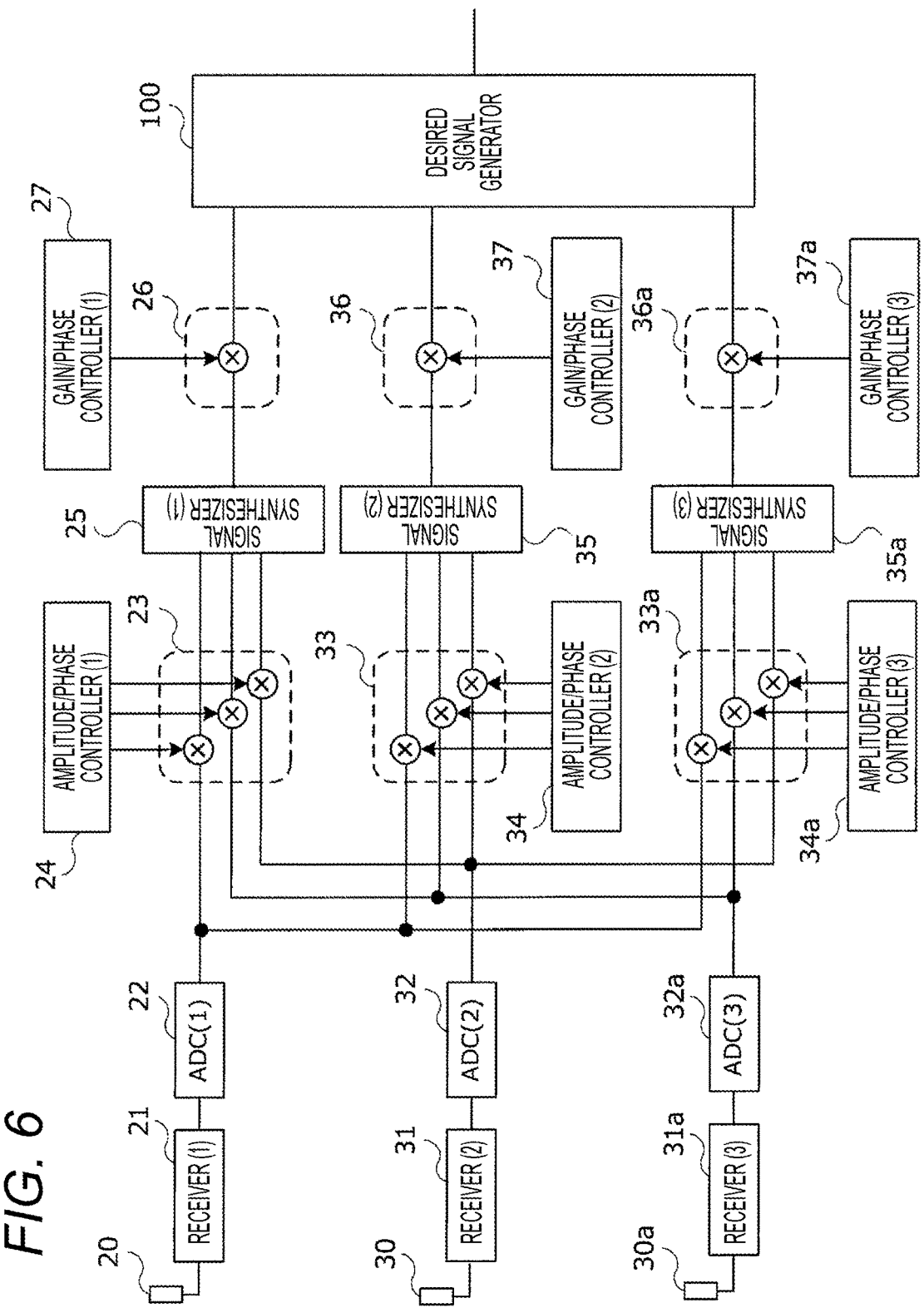
FIG. 6 is a configuration block diagram of a third reception device.

[Third Reception Device: FIG. 6]

Next, a third reception device according to the embodiment of the present disclosure will be described with reference to FIG. 6. FIG. 6 is a configuration block diagram of the third reception device.

The third reception device has three or more antennas such that interference wave signals from a plurality of directions can be properly removed in a case where a desired signal is a target wave signal.

As illustrated in FIG. 6, the third reception device is different from the first reception device in that an antenna 30a, a receiver (3) 31a, an ADC (3) 32a, amplitude/phase adjusters (3) 33a, an amplitude/phase controller (3) 34a, a signal synthesizer (3) 35a, a gain/phase adjuster (3) 36a, and a gain/phase controller (3) 37a are included.

A radio signal input to the antenna 30a is received by the receiver (3) 31a and then converted from an analog signal to a digital signal by the ADC (3) 32a.

The signal from the ADC (3) 32a is divided and output to an amplitude/phase adjuster (1) 23, an amplitude/phase adjuster (2) 33, and the amplitude/phase adjuster (3) 33a.

The amplitude/phase adjuster (1) 23 multiplies signals from an ADC (1) 22, an ADC (2) 32, and the ADC (3) 32a by a coefficient output from an amplitude/phase controller (1) 24 and outputs the result to a signal synthesizer (1) 25.

The amplitude/phase adjusters (2) 33 multiply the signals from the ADC (1) 22, the ADC (2) 32, and the ADC (3) 32a by a coefficient output from an amplitude/phase controller (2) 34 and output the results to a signal synthesizer (2) 35.

The amplitude/phase adjusters (3) 33a multiply the signals from the ADC (1) 22, the ADC (2) 32, and the ADC (3) 32a by a coefficient output from the amplitude/phase controller (3) 34a and output the results to the signal synthesizer (3) 35a.

In the amplitude/phase adjusters (2) 33, the amplitude/phase controller (2) 34, and a signal synthesizer (2) 35, a directivity pattern directed toward an arrival direction of a first signal that is a signal other than a desired signal is formed while a null point is formed in an arrival direction of the desired signal.

On the other hand, in the amplitude/phase adjusters (3) 33a, the amplitude/phase controller (3) 34a, and a signal synthesizer (3) 35a, a directivity pattern directed toward an arrival direction of a second signal that is a signal other than a desired signal is formed while a null point is formed in an arrival direction of the desired signal.

That is, in the signal synthesizer (2) 35 and the signal synthesizer (3) 35a, directivity patterns are formed toward the arrival directions of different signal waves other than the desired signal.

Then, the gain/phase adjuster (3) 36a multiplies the signal from the signal synthesizer (3) 35a by a coefficient from the gain/phase controller (3) 37a and thereby optimizes and outputs the signal to a desired signal generator 100.

The desired signal generator 100 combines signals from a gain/phase adjuster (1) 26, a gain/phase adjuster (2) 36, and the gain/phase adjuster (3) 36a.

That is, the desired signal generator 100 removes signals from the gain/phase adjuster (2) 36 and the gain/phase adjuster (3) 36a from the desired signal from the gain/phase adjuster (1) 26 and outputs the result.

For example, let the desired signal be a target wave signal, the directivity pattern formed by the signal generator (2) 35 be a directivity pattern of the arrival direction of the first interference wave, and the directivity pattern formed by the signal generator (3) 35a be a directivity pattern of the arrival direction of the second interference wave.

Then, the desired signal generator 100 generates a signal in which a first interference wave signal obtained by the directivity pattern of the first interference wave and a second interference wave signal obtained by the directivity pattern of the second interference wave are removed from a target wave signal obtained by the directivity pattern of the target wave signal.

Figure 7:
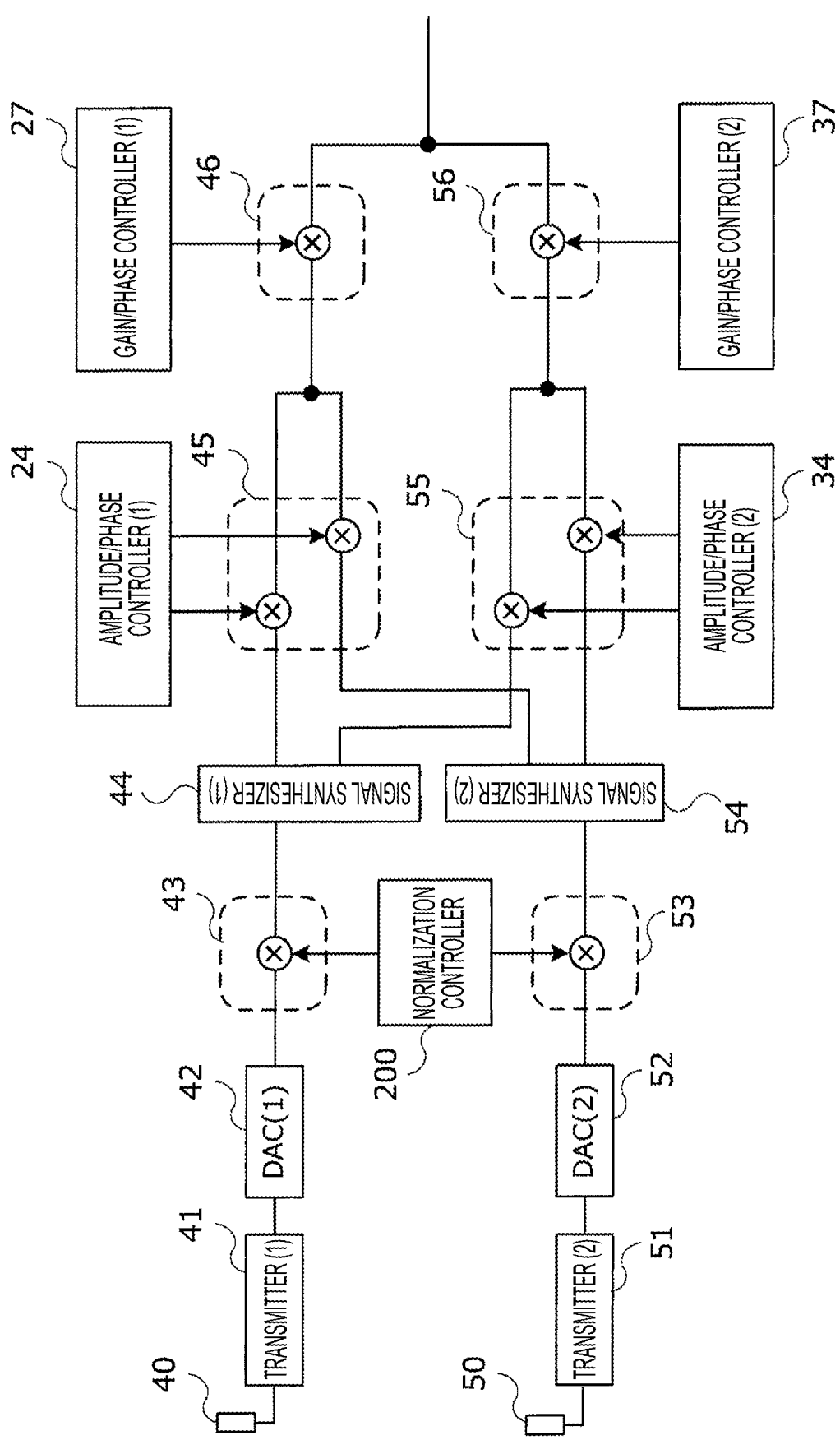
FIG. 7 is a configuration block diagram of a transmission device in the present transmission/reception device.
Figure 8:
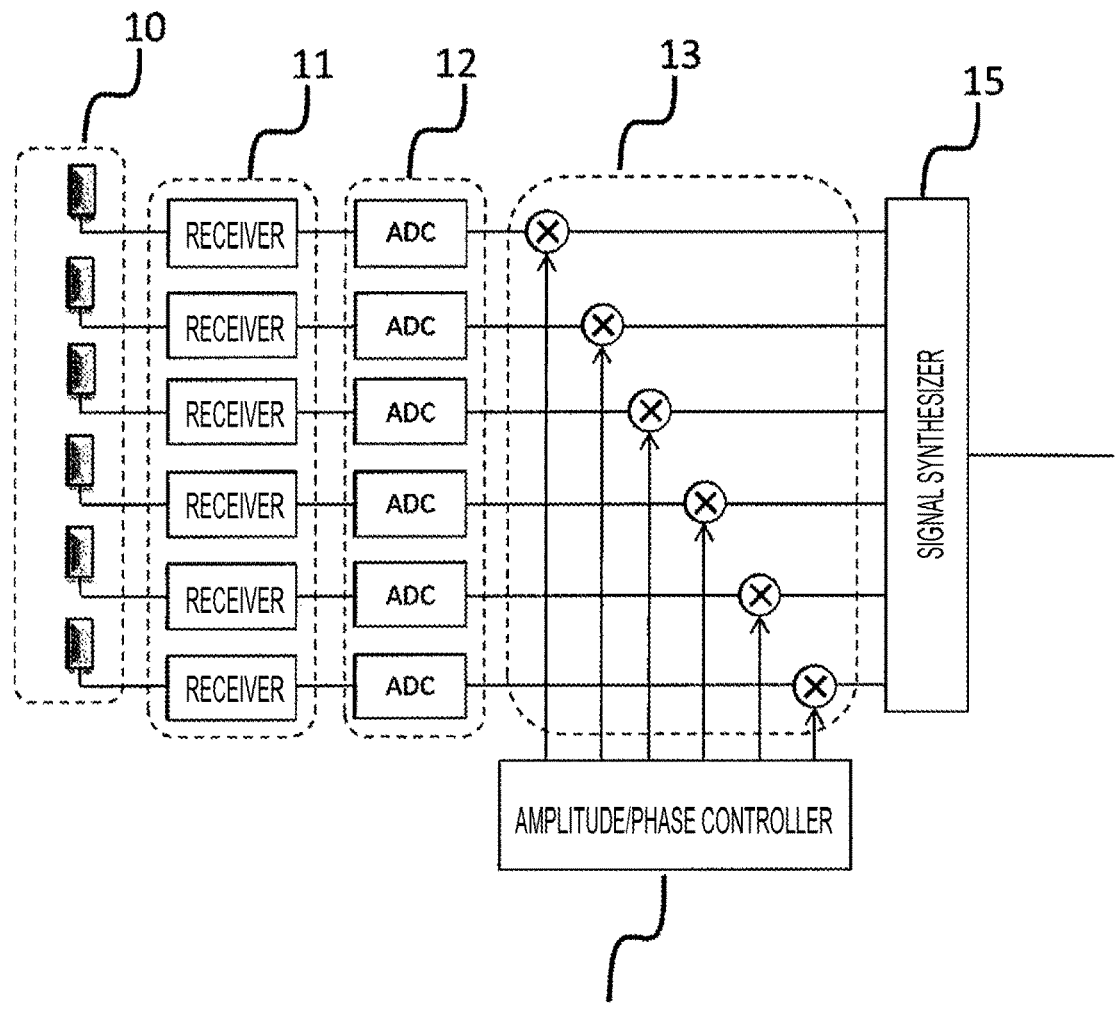
FIG. 8 is a configuration block diagram of a conventional reception device.
Figure 9:
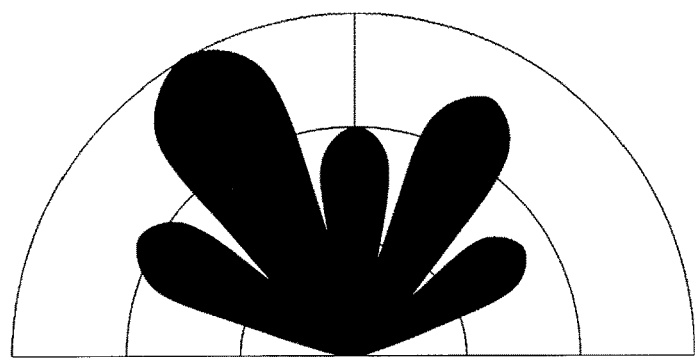
FIG. 9 is a diagram illustrating an example of a conventional antenna radiation pattern.

[Transmission/Reception Device: FIG. 7]

Next, a transmission/reception device (present transmission/reception device) according to an embodiment of the present disclosure will be described with reference to FIG. 7. FIG. 7 is a configuration block diagram of a transmission device in the present transmission/reception device.

As illustrated in FIG. 7, the transmission device (present transmission device) in the present transmission/reception device essentially includes antennas 40 and 50, a transmitter (1) 41, a transmitter (2) 51, a digital analog converter (DAC) (1) 42, a DAC (2) 52, a normalization adjuster (1) 43, a normalization adjuster (2) 53, a normalization controller 200, a signal synthesizer (1) 44, a signal synthesizer (2) 54, amplitude/phase adjusters (1) 45, amplitude/phase adjusters (2) 55, an amplitude/phase controller (1) 24, an amplitude/phase controller (2) 34, a gain/phase adjuster (1) 46, a gain/phase adjuster (2) 56, a gain/phase controller (1) 27, and a gain/phase controller (2) 37.

A transmission signal (digital signal) is divided into a first transmission signal inputting to the gain/phase adjuster (1) 46, and a second transmission signal inputting to the gain/phase adjuster (2) 56.

The gain/phase adjuster (1) 46 multiplies the first transmission signal by a coefficient for controlling the gain and phase from the gain/phase controller (1) 27 and outputs the result to the amplitude/phase adjusters (1) 45.

The gain/phase adjuster (2) 56 multiplies the transmission signal by a coefficient for controlling the gain and phase from the gain/phase controller (2) 37 and outputs the result to the amplitude/phase adjusters (2) 55.

The gain/phase controller (1) 27 can be shared with the present reception device and uses the same coefficient. In addition, the gain/phase controller (2) 37 can be shared with the present reception device and uses the same coefficient. In a case that computation is performed using a complex number, the coefficient to compute the transmission signal can be a complex conjugate for the reception signal.

This is due to that, by using the same coefficients as the coefficients for controlling the gain and the phase in the reception processing of the present reception device, a directivity of a transmission signal can be similar to the directivity pattern of a reception signal.

The amplitude/phase adjusters (1) 45 each receives a divided signal from the gain/phase adjuster (1) 46, can multiply the signal by a coefficient for controlling the amplitude and the phase from the amplitude/phase controller (1) 24, and output the signal to the signal synthesizer (1) 44 and the signal synthesizer (2) 54.

The amplitude/phase controller (1) can be configured to control an amplitude and a phase of a first transmitting signal to obtain a directivity for the desired signal and to output a first desired signal to the signal synthesizer (1) 44, as a first transmitting synthesizer, and control an amplitude and a phase of a first transmitting signal to obtain a directivity for the desired signal and to output a second desired signal to the signal synthesizer (2) 54, as a second transmitting synthesizer.

The amplitude/phase adjusters (2) 55 each receives a divided signal from the gain/phase adjuster (2) 56, can multiply the signal by a coefficient for controlling the amplitude and the phase from the amplitude/phase controller (2) 34, and output the signal to the signal synthesizer (1) 44 and the signal synthesizer (2) 54.

The amplitude/phase controller (2) can be configured to control an amplitude and a phase of a second transmitting signal to obtain a directivity for the first undesirable signal by identifying an arrival direction of the desired signal as a null point, and to output a first undesirable signal to the signal synthesizer (1) 44, as the first transmitting synthesizer, and control an amplitude and a phase of a second transmitting signal to obtain a directivity for the first undesirable signal by identifying an arrival direction of the desired signal as a null point, and to output a second undesirable signal to the signal synthesizer (2) 54, as the second transmitting synthesizer.

The amplitude/phase controller (1) 24 is shared with the present reception device and can use the same coefficient. In addition, the amplitude/phase controller (2) 34 is shared with the present reception device and can use the same coefficient. In a case that computation is performed using a complex number, the coefficient to compute the transmission signal can be a complex conjugate for the reception signal.

This is due to that, by using the same coefficients as the coefficients for controlling the amplitude and the phase in the reception processing of the present reception device, a directivity of a transmission signal can be similar to the directivity pattern of a reception signal.

The signal synthesizer (1) 44 receives and combines signals from an amplitude/phase adjuster (1) 45 and an amplitude/phase adjuster (2) 55 and outputs the result to the normalization adjuster (1) 43.

The signal synthesizer (2) 54 receives and combines signals from an amplitude/phase adjuster (1) 45 and an amplitude/phase adjuster (2) 55 and outputs the result to the normalization adjuster (2) 53.

The normalization controller 200 outputs a coefficient for controlling normalization in the normalization adjuster (1) 43 and the normalization adjuster (2) 53 to the normalization adjuster (1) 43 and the normalization adjuster (2) 53.

The normalization adjuster (1) 43 multiplies the signal from the signal synthesizer (1) 44 by the coefficient from the normalization controller 200 and outputs the result to the DAC (1) 42.

The normalization adjuster (2) 53 multiplies the signal from the signal synthesizer (2) 54 by the coefficient from the normalization controller 200 and outputs the result to the DAC (2) 52.

The DAC (1) 42 converts the signal from the normalization adjuster (1) 43 from a digital signal to an analog signal, which is then output from the antenna 40 via the transmitter (1) 41.

The DAC (2) 52 converts the signal from the normalization adjuster (2) 53 from a digital signal to an analog signal, which is then output from the antenna 50 via the transmitter (2) 51.

Note that in the multiplication of the coefficients in the gain/phase adjuster (1) 46, the gain/phase adjuster (2) 56, the amplitude/phase adjusters (1) 45, and the amplitude/phase adjusters (2) 55, it is assumed that computation is performed with a complex conjugate of the coefficients used in the first to the third reception devices (reception systems) in the case where a complex signal is dealt with.

In the case where a desired signal is a target wave signal and a value of the coefficient for adjustment of the reception amplitude is smaller than 1 in order to suppress an interference wave signal, the value is adjusted to be 1 in the normalization controller 200, and then normalization is performed by each of the normalization adjuster (1) 43 and the normalization adjuster (2) 53.

[Effect of Transmission/Reception Device]

According to the present transmission/reception device, by sharing the amplitude/phase controller (1) 24, the amplitude/phase controller (2) 34, the gain/phase controller (1) 27, and the gain/phase controller (2) 37 of the reception device with the transmission device and using the coefficients used in the reception processing in the reception device also in the transmission processing, the same directivity pattern, as the directivity pattern of the desired signal formed in the reception, can be formed also in the transmission, thereby allowing a transmission signal to be transmitted in a desired direction.

In other words, by applying, also to the transmission signal, the coefficients for the amplitude/phase control used for generation of the signal obtained by directing the main lobe to the desired signal specified by the reception signal in the first to the third reception devices and generation of the signal acquired by directing the null point, a directivity equivalent to the narrow directivity formed by the reception signal can be implemented also in the transmission signal.

By using the first to the third reception devices in a communication environment in which an arrival direction of a desired signal can be estimated, the radio quality can be improved by using a small-scale antennas and a radio device.

Since the necessary transmission power can be suppressed according to the transmission/reception device, it can be expected to increase the number of accommodated users, to expand a coverage area, to improve of a throughput, etc. Overall, the radio quality can be improved, and the power consumption can be mitigated.

This application claims the benefit of priority based on Japanese patent application No. 2016-042254 filed on Mar. 4, 2016, the disclosure of which is incorporated herein by reference in its entirety.

INDUSTRIAL APPLICABILITY

The present disclosure is suitable for a reception device and a transmission/reception device capable of reducing the number of antennas and thereby achieving the effect of downsizing with suppressed power consumption and improved communication quality.

REFERENCE SIGNS LIST

10 Antenna
11 Receiver

12 ADC
13 Amplitude/phase adjuster
14 Amplitude/phase controller
15 Signal synthesizer
20, 20a Antenna
21 Receiver (1)
21a Receiver (3)
22 ADC(1)
22a ADC(3)
23 Amplitude/phase adjuster (1)
24 Amplitude/phase controller (1)
25 Signal synthesizer (1)
26 Gain/phase adjuster (1)
27 Gain/phase controller (1)
30, 30a Antenna
31 Receiver (2)
31a Receiver (3)
32 ADC(2)
32a ADC(3)
33 Amplitude/phase adjuster (2)
33a Amplitude/phase adjuster (3)
34 Amplitude/phase controller (2)
34a Amplitude/phase controller (3)
35 Signal synthesizer (2)
35a Signal synthesizer (3)
36 Gain/phase adjuster (2)
36a Gain/phase adjuster (3)
37 Gain/phase controller (2)
37a Gain/phase controller (3)
40 Antenna
41 Transmitter (1)
42 DAC(1)
43 Normalization adjuster (1)
44 Signal synthesizer (1)
45 Amplitude/phase adjuster (1)
46 Gain/phase adjuster (1)
50 Antenna
51 Transmitter (2)
52 DAC(2)
53 Normalization adjuster (2)
54 Signal synthesizer (2)
55 Amplitude/phase adjuster (2)
56 Gain/phase adjuster (2)
100 Desired signal generator
200 Normalization controller

The invention claimed is:

1. A device comprising:
a first amplitude and phase controller configured to:
control a first amplitude and phase of a first receiving signal being input by a first receiving antenna to obtain a first directivity for a desired signal and to output a first desired signal, and
control a first amplitude and phase of a second receiving signal being input by a second receiving antenna to obtain a second directivity for the desired signal and to output a second desired signal;
a second amplitude and phase controller configured to:
control a second amplitude and phase of the first receiving signal to obtain a first directivity for a first undesirable signal by identifying a first arrival direction of the desired signal as a first null point and to output a first null point signal, and
control a second amplitude and phase of the second receiving signal to obtain a second directivity for the first undesirable signal by identifying a second arrival direction of the desired signal as a second null point and to output a second null point signal;
a first receiving synthesizer configured to:
synthesize the first desired signal with the second desired signal, and
output a first receiving synthesized signal;
a second receiving synthesizer configured to:
synthesize the first null point signal with the second null point signal, and
output a second receiving synthesized signal; and
a desired signal generator configured to output a synthesized receiving signal synthesizing the first receiving synthesized signal with the second receiving synthesized signal.

2. The device according to claim 1, further comprising a gain and phase controller configured to control a gain and a phase of the second receiving synthesized signal.

3. The device according to claim 2,
wherein the second amplitude and phase controller is further configured to:
control a third amplitude and phase of the first receiving signal to obtain a first directivity for a second undesirable signal by identifying a third arrival direction of the desired signal as a third null point, and
control a third amplitude and phase of the second receiving signal to obtain a second directivity for the second undesirable signal by identifying a fourth arrival direction of the desired signal as a fourth null point; and
further comprising a synthesizer configured to synthesize signals including a signal as to the second undesirable signals.

4. The device according to claim 3, wherein the desired signal is at least one of: a target wave signal or an interference wave signal.

5. The device according to claim 4,
wherein the first amplitude and phase controller is further configured to:
control a first amplitude and phase of a first transmitting signal to obtain a third directivity for the desired signal and output a third desired signal to a first transmitting synthesizer, and
control a second amplitude and phase of the first transmitting signal to obtain a fourth directivity for the desired signal and output a fourth desired signal to a second transmitting synthesizer,
wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output the second undesirable signal to the second transmitting synthesizer,
wherein the first transmitting synthesizer is configured to:
synthesize the third desired signal with the first undesirable signal, and
output a first transmitting synthesized signal;
wherein the second transmitting synthesizer is configured to:
synthesize the fourth desired signal with the second undesirable signal, and output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

6. The device according to claim 3,
wherein the first amplitude and phase controller is further configured to:
control a first amplitude and phase of a first transmitting signal to obtain a third directivity for the desired signal and to output a third desired signal to a first transmitting synthesizer, and
control a second amplitude and phase of the first transmitting signal to obtain a fourth directivity for the desired signal and to output a fourth desired signal to a second transmitting synthesizer,
wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output the second undesirable signal to the second transmitting synthesizer,
wherein the first transmitting synthesizer is configured to:
synthesize the third desired signal with the first undesirable signal, and
output a first transmitting synthesized signal;
wherein the second transmitting synthesizer is configured to:
synthesize the fourth desired signal with the second undesirable signal, and
output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

7. The device according to claim 2,
wherein the desired signal corresponds to a target wave signal, and the first undesirable signal corresponds to an interference wave signal, and
wherein the gain and phase controller is further configured to control the gain and phase of the second receiving synthesized signal so that the gain of the second receiving synthesized signal is less than or equal to one and the phase of the second receiving synthesized signal is suppressed.

8. The device according to claim 7, wherein the receiving synthesized signal is generated by removing the second receiving synthesized signal from the first receiving synthesized signal.

9. The device according to claim 2, wherein the desired signal is at least one of: a target wave signal or an interference wave signal.

10. The device according to claim 9,
wherein the first amplitude and phase controller is further configured to:
control a first amplitude and phase of a first transmitting signal to obtain a third directivity for the desired signal and to output a third desired signal to a first transmitting synthesizer, and
control a second amplitude and phase of the first transmitting signal to obtain a fourth directivity for the desired signal and to output a fourth desired signal to a second transmitting synthesizer,
wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output a second undesirable signal to the second transmitting synthesizer,
wherein the first transmitting synthesizer is configured to:
synthesize the third desired signal with the first undesirable signal, and
output a first transmitting synthesized signal;
wherein the second transmitting synthesizer configured to:
synthesize the fourth desired signal with the second undesirable signal, and
output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

11. The device according to claim 2,
wherein the first amplitude and phase controller is further configured to:
control a first amplitude and phase of a first transmitting signal to obtain a third directivity for the desired signal and to output a third desired signal to a first transmitting synthesizer, and
control a second amplitude and phase of the first transmitting signal to obtain a fourth directivity for the desired signal and to output a fourth desired signal to a second transmitting synthesizer, wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output a second undesirable signal to the second transmitting synthesizer,
wherein the first transmitting synthesizer is configured to:
synthesize the third desired signal with the first undesirable signal, and
output a first transmitting synthesized signal;
wherein the second transmitting synthesizer configured to:
synthesize the fourth desired signal with the second undesirable signal, and
output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

12. The device according to claim 1, wherein the desired signal is at least one of: a target wave signal or an interference wave signal.

13. The device according to claim 12,
wherein the first amplitude and phase controller is further configured to:
control a first amplitude and phase of a first transmitting signal to obtain a third directivity for the desired signal and to output a third desired signal to a first transmitting synthesizer, and
control a second amplitude and phase of the first transmitting signal to obtain a fourth directivity for the desired signal and to output a fourth desired signal to a second transmitting synthesizer,
wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output a second undesirable signal to the second transmitting synthesizer,
wherein the first transmitting synthesizer is configured to:
synthesize the third desired signal with the first undesirable signal, and
output a first transmitting synthesized signal;
wherein the second transmitting synthesizer is configured to:
synthesize the fourth desired signal with the second undesirable signal, and
output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

14. The device according to claim 1,
wherein the first amplitude and phase controller is further configured to:
control a first amplitude and phase of a first transmitting signal to obtain a third directivity for the desired signal and to output a third desired signal to a first transmitting synthesizer, and
control a second amplitude and phase of the first transmitting signal to obtain a fourth directivity for the desired signal and to output a fourth desired signal to a second transmitting synthesizer,
wherein the second amplitude and phase controller is further configured to:
control a first amplitude and phase of a second transmitting signal to obtain a third directivity for the first undesirable signal by identifying a third arrival direction of the desired signal as a third null point and output the first undesirable signal to the first transmitting synthesizer, and
control a second amplitude and phase of the second transmitting signal to obtain a fourth directivity for the first undesirable signal by identifying a fourth arrival direction of the desired signal as a fourth null point and output a second undesirable signal to the second transmitting synthesizer;
wherein the first transmitting synthesizer is configured to:
synthesize the third desired signal with the first undesirable signal, and
output a first transmitting synthesized signal;
wherein the second transmitting synthesizer is configured to:
synthesize the fourth desired signal with the second undesirable signal, and
output a second transmitting synthesized signal; and
further comprising:
a normalizer configured to:
perform normalization of the first transmitting synthesized signal and output a first normalized signal to a first digital analog convertor, and
perform normalization of the second transmitting synthesized signal and output a second normalized signal to a second digital analog convertor;
a first transmitter configured to transmit the first normalized signal via a first transmitting antenna; and
a second transmitter configured to transmit the second normalized signal via a second transmitting antenna.

15. The device according to claim 14,
wherein the first amplitude and phase controller is further configured to:

control a third amplitude and phase of the first transmitting signal connected to the first transmitting synthesizer by using a first corresponding coefficient used in a first reception processing, and control a fourth amplitude and phase of the first transmitting signal connected to the second transmitting synthesizer by using a second corresponding coefficient used in a second reception processing, and wherein the second amplitude and phase controller is further configured to:

control a third amplitude and phase of the second transmitting signal connected to the first transmitting synthesizer by using a third corresponding coefficient used in a third reception processing, and control a fourth amplitude and phase of the second transmitting signal connected to the second transmitting synthesizer by using a fourth corresponding coefficient used in a fourth reception processing.

16. The device according to claim 15,
wherein the gain and phase controller further comprising a first gain and phase controller configured to:
control the gain and phase of the second synthesized signal in a fifth reception processing, and
control a gain and phase of the first transmitting signal, by using a sixth corresponding coefficient used in a sixth reception processing.

17. The device according to claim 14, wherein the first receiving antenna is shared with the first transmitting antenna.

18. The device according to claim 14, wherein the second receiving antenna is shared with the second transmitting antenna.

* * * * *